United States Patent [19]
Hunter

[11] Patent Number: 5,842,689
[45] Date of Patent: Dec. 1, 1998

[54] CHOPPING BOARD SYSTEM

[76] Inventor: Thomas Hunter, 4236 Welbourn Dr., Decatur, Ga. 30035

[21] Appl. No.: 832,227

[22] Filed: Apr. 3, 1997

[51] Int. Cl.⁶ .............................. A47J 47/00; B23Q 1/00; B23Q 3/00

[52] U.S. Cl. ..................... 269/54.5; 99/419; 99/646 R; 269/293

[58] Field of Search .............................. 99/467, 419, 349, 99/421 A, 646 R, 532; 269/53–54.5, 293, 258; 452/195, 196, 132

[56] References Cited

U.S. PATENT DOCUMENTS

| | | | |
|---|---|---|---|
| 328,995 | 10/1885 | Andrews | 269/54.5 |
| 361,742 | 4/1887 | Bennett | 99/419 |
| 931,587 | 8/1909 | Fairbanks | 99/419 |
| 1,630,188 | 5/1927 | Knauff | 99/419 |
| 1,728,064 | 9/1929 | Johnson | 99/419 |
| 1,890,907 | 12/1932 | Hoover | 99/419 |
| 1,969,601 | 8/1934 | Foch | 99/419 |
| 3,908,231 | 9/1975 | Price et al. | 17/70 |
| 4,170,933 | 10/1979 | Meamber | 99/349 |
| 4,217,817 | 8/1980 | Meamber | 99/349 |
| 5,100,115 | 3/1992 | Schorn | 269/302.1 |
| 5,363,755 | 11/1994 | Liang | 99/484 |
| 5,527,022 | 6/1996 | Gibson | 269/13 |

*Primary Examiner*—Timothy F. Simone
*Attorney, Agent, or Firm*—Joseph N. Breaux

[57] ABSTRACT

A chopping board system including a chopping board member having a first surface defined by a first perimeter edge and formed from a non-skid material and a second surface defined by a second perimeter edge and formed from a chopping board material, the chopping board member having a plurality of securing pin passageways formed entirely through the chopping board member between the first and second surfaces; and a plurality of anchoring pins sized to frictionally fit into the securing pin passageways, each anchoring pin having at least one pointed pin end for insertion through an item to be chopped.

6 Claims, 3 Drawing Sheets

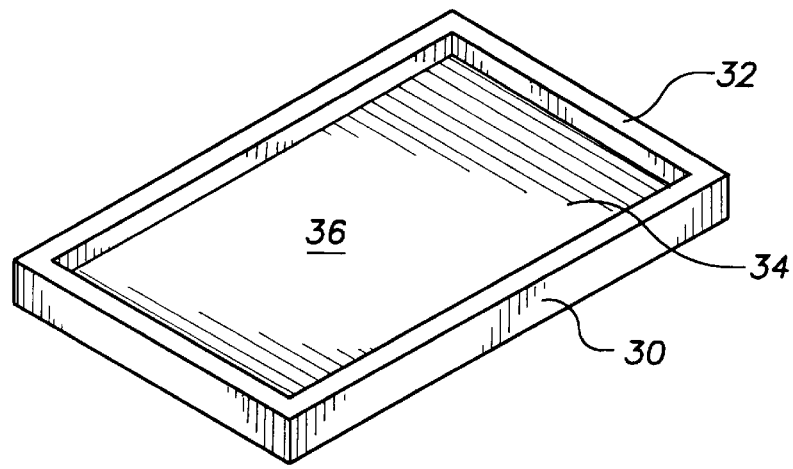
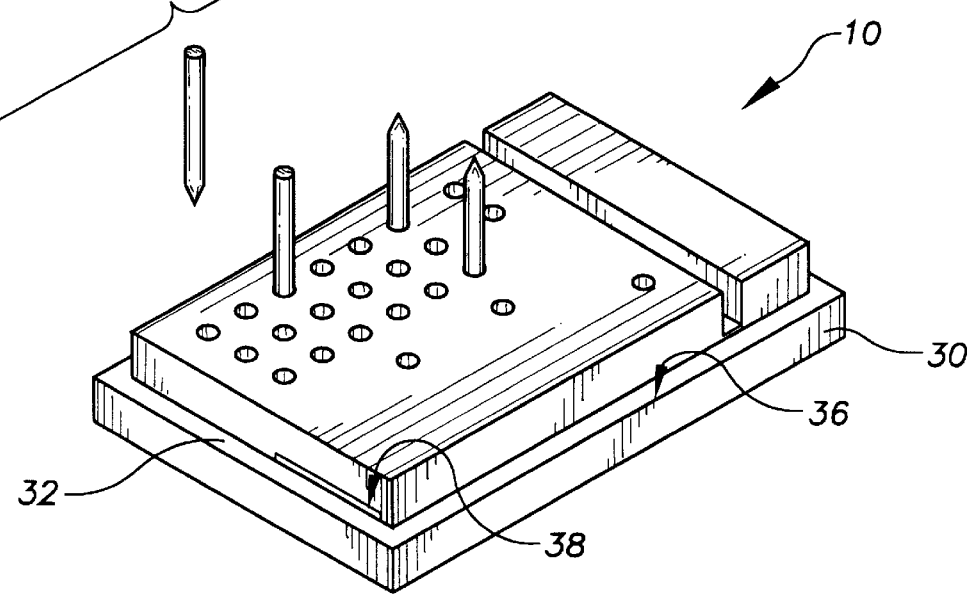

CHOPPING BOARD SYSTEM

TECHNICAL FIELD

The present invention relates to chopping boards used for cutting food items into small pieces and more particularly to a chopping board system for use by individuals having the use of only one hand that includes a chopping board member having a first surface defined by a first perimeter edge and formed from a nonskid material and a second surface defined by a second perimeter edge and formed from a chopping board material, the chopping board member having a plurality of securing pin passageways formed entirely through the chopping board member between the first and second surfaces; and a plurality of anchoring pins sized to frictionally fit into the securing pin passageways, each anchoring pin having at least one pointed pin end for insertion through an item to be chopped.

BACKGROUND OF THE INVENTION

It can be extremely difficult for individuals with the use of only one hand to perform tasks such as chopping and slicing food items. It would be a benefit to these individuals to have a chopping board system that provided a mechanism for securing the item to be chopped to the chopping board. Because an item can often need to be chopped into numerous pieces, it would be a further benefit to have a chopping board system that included a mechanism for securing the item to be chopped at a number of independent locations. Because it can be difficult to maintain the chopping board in a fixed location while chopping an item, it would also be desirable to have a chopping board member that included a non-skid surface to prevent skidding of the chopping board member during use. It would of course be further desirable to have a nonskid surface that was formed from a restickable adhesive material. Because the restickable adhesive could become soiled over time, it would be a further benefit to have a tray member that included an edge portion that defined a cavity sized to receiving the non-skid surface therein.

SUMMARY OF THE INVENTION

It is thus an object of the invention to provide a chopping board system that includes a mechanism for securing the item to be chopped to the chopping board.

It is a further object of the invention to provide a chopping board system that includes a mechanism for securing the item to be chopped at a number of independent locations.

It is a still further object of the invention to provide a chopping board system that includes a chopping board member having a non-skid surface.

It is a still further object of the invention to provide a chopping board system that includes a chopping board member having a non-skid surface at least partially formed with a restickable adhesive material.

It is a still further object of the invention to provide a chopping board system that includes a chopping board member having a non-skid surface at least partially formed with a restickable adhesive material that further includes a tray member having an edge portion that defines a cavity sized to receive the non-skid surface therein.

It is a still further object of the invention to provide a chopping board system that includes a chopping board member having a first surface defined by a first perimeter edge and formed from a non-skid material and a second surface defined by a second perimeter edge and formed from a chopping board material, the chopping board member having a plurality of securing pin passageways formed entirely through the chopping board member between the first and second surfaces; and a plurality of anchoring pins sized to frictionally fit into the securing pin passageways, each anchoring pin having at least one pointed pin end for insertion through an item to be chopped. The term "chopping board material" is used herein to mean any convention material used in producing conventional chopping boards.

It is a still further object of the invention to provide a chopping board system that accomplishes some or all of the above objects in combination.

Accordingly, a chopping board system is provided. The chopping board system includes a chopping board member having a first surface defined by a first perimeter edge and formed from a non-skid material and a second surface defined by a second perimeter edge and formed from a chopping board material, the chopping board member having a plurality of securing pin passageways formed entirely through the chopping board member between the first and second surfaces; and a plurality of anchoring pins sized to frictionally fit into the securing pin passageways, each anchoring pin having at least one pointed pin end for insertion through an item to be chopped. The chopping board member preferably includes a compartment formed therein for storing the securing pins. In another preferred embodiment, the non-skid surface is at least partially formed with a restickable adhesive material. When the non-skid surface includes a restickable adhesive material, the chopping board system preferably further includes a tray member having an edge portion that defines a cavity sized to receive the non-skid surface therein.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a perspective view of the tray member of the chopping board system of the present invention showing the tray member and the raised edge of the tray member defining a cavity sized to receive the first side surface of the chopping board therein.

FIG. 4 is a perspective view of the first side surface of the chopping board member inserted into the cavity of the tray member.

DESCRIPTION OF THE EXEMPLARY EMBODIMENT

Figure 1:
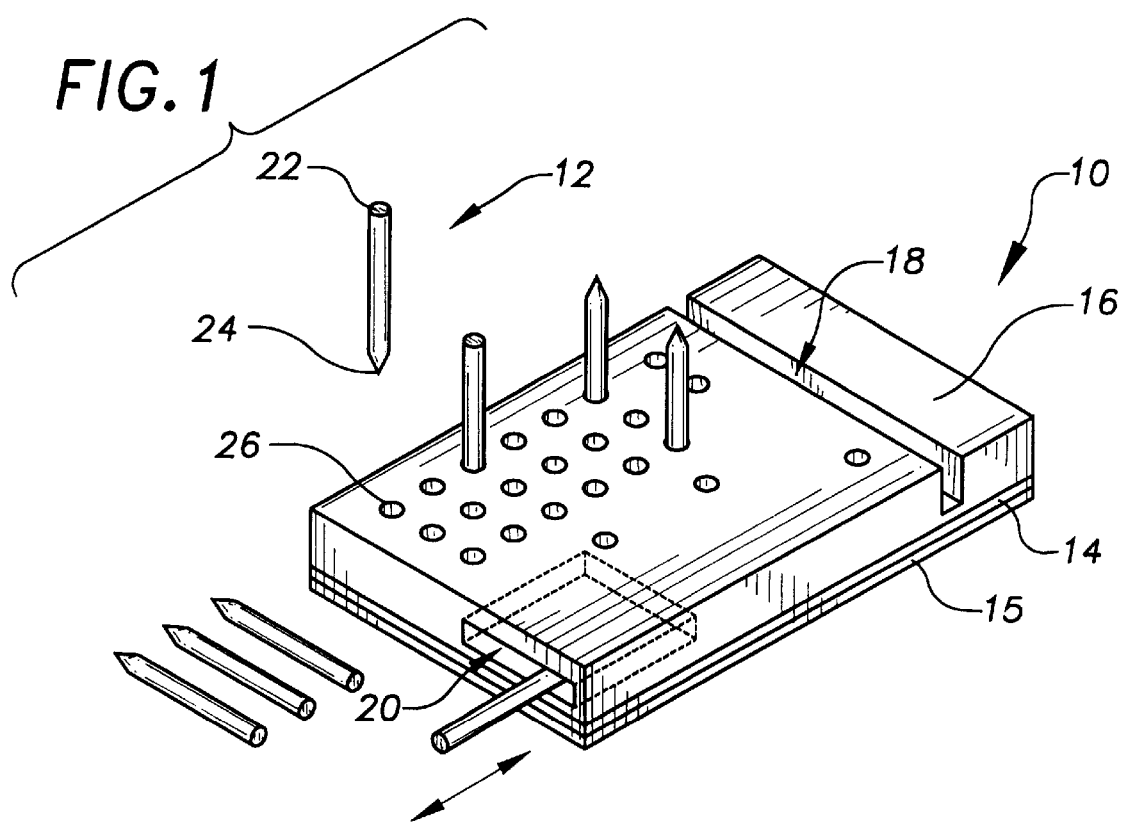
FIG. 1 is a perspective view of an exemplary embodiment of the chopping board assembly of the chopping board system of the present invention showing the chopping board member, the knife blade receiving slot, the securing pin passageways formed through the chopping board member, the non-skid material secured to the first side surface of the chopping board member, a number of securing pins each having one pointed end, and a securing pin storage chamber.

FIG. 1 shows exemplary embodiments of the chopping board member and the securing pins of the chopping board system of the present invention generally designated respectively by the numerals 10,12. In this embodiment, chopping board member 10 includes a first surface 14 formed from a non-skid plastic material having a coating 15 of restickable adhesive deposited thereon. Second surface 16 is formed from a substantially rectangular section of wood. A one-quarter inch wide by one inch deep knife slot 18 is formed across the width of second surface 16 to allow the blade of a chopping knife to be rested when not needed. A substantially rectangular securing pin storage compartment 20 is formed into the side surface of second surface 16 adjacent to first surface 14. Securing pin storage compartment 20 is sized to receive and hold all of the securing pins 12. In this embodiment securing pins 12 are three inch long stainless steel pins having a blunt end 22 and a sharp end 24.

Figure 2:
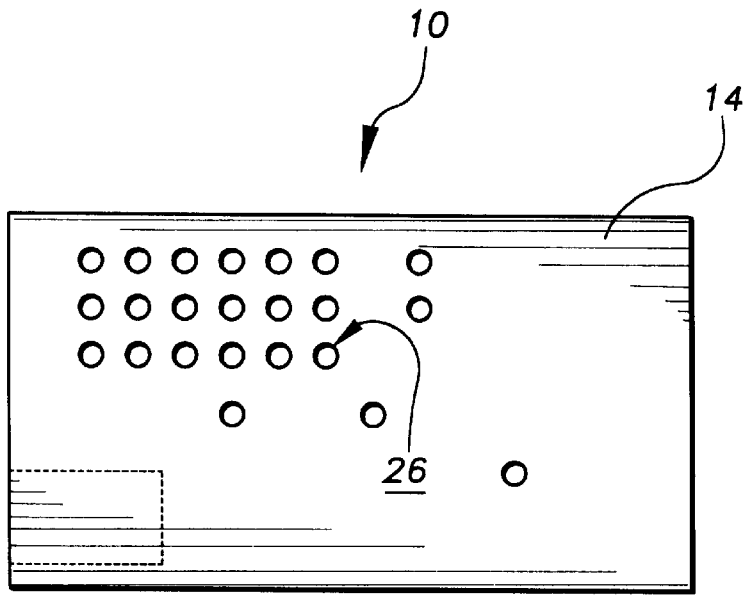
FIG. 2 is a top view of the chopping board member of FIG. 1 showing the securing passageways formed through the chopping board member.

Referring to FIG. 2, in this embodiment chopping board member 10 has a number of spaced apart securing pin passageways 26 formed entirely through first surface 14 and second surface 16 (FIG. 1). The diameter of each securing pin passageway 26 is selected such that securing pins 12 can be inserted and frictionally held therewithin. Referring back to FIG. 1, in use in some instances it can be desirable to insert the blunt end 22 of some securing pins 12 into selected securing pin passageways 26 so that the item, such as an apple, can be placed down onto the pointed end 24 and held in place. In other situations, such as when cutting a piece of meat, it is preferred to place the piece of meat onto second surface 16 and then secure the meat section to chopping board member 10 by inserting the pointed ends 24 through the meat section and into a securing pin passageway 26.

Because first surface 14 includes a coating 15 of a restickable adhesive, it is desirable to cover first surface 14 when not in use. Referring now to FIG. 3, in this embodiment the chopping board system of the present invention includes a tray member, generally designated by the numeral 30, for covering first surface 14 when not needed. Tray member 30 is constructed from wood and includes a raised perimeter edge 32 and a top surface 34 that define a cavity 36. With reference to FIG. 4, cavity 36 of tray member 30 is sized to receive first side surface 14 (FIG. 1) of chopping board member 10 therein to a sufficient depth to allow perimeter edge 32 to functionally block the access opening 38 into securing pin storage compartment 20 (FIG. 1). The term "functionally block" is used herein to mean prevent insertion and removal of securing pins 12 into or out of securing pin storage compartment 20.

Figure 5:
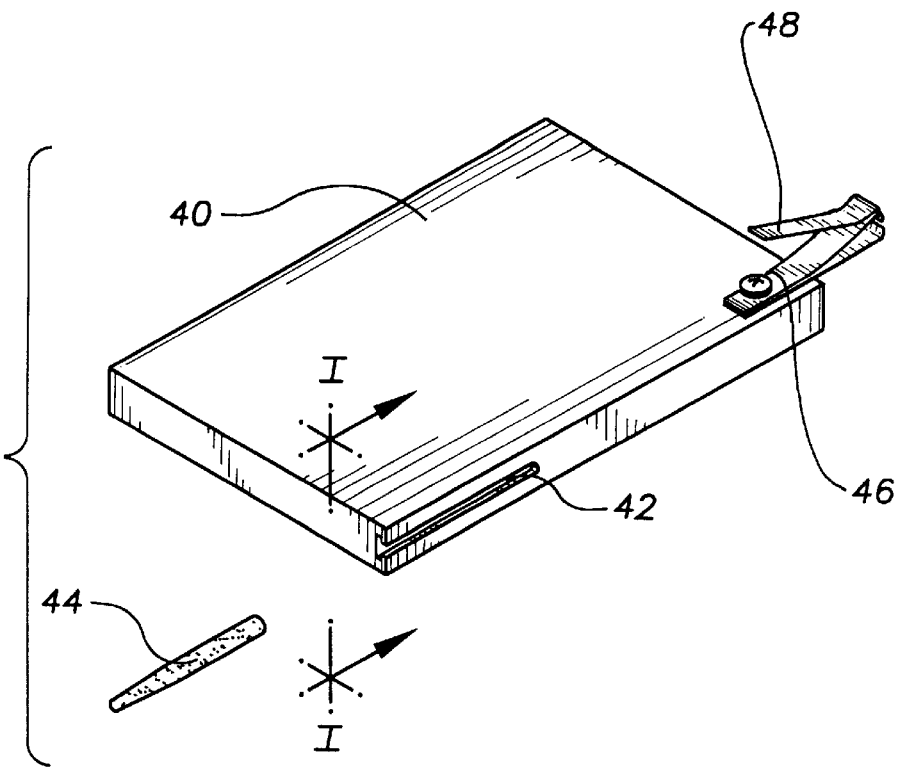
FIG. 5 is a perspective view of the nail cutting and manicuring board of the chopping board system of the present inventions showing the manicure board, the side slot adapted for receiving and holding an emery board, and the nail clipper retaining screw and screw aperture.
Figure 6:
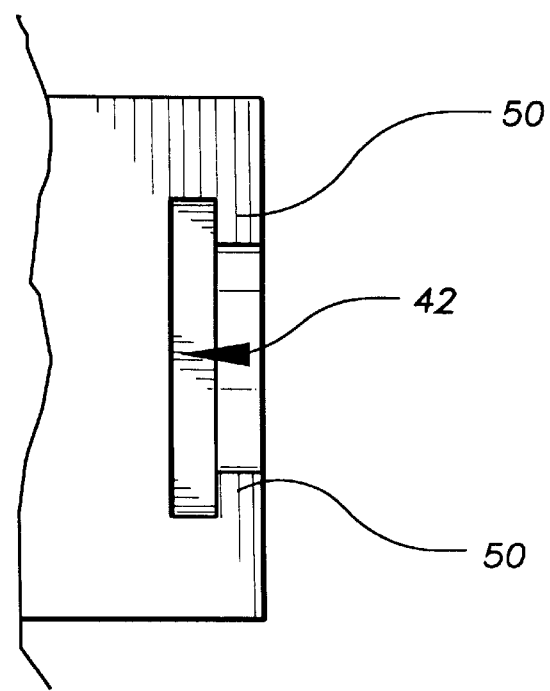
FIG. 6 is a detail cross-section view of the side edge of the nail cutting and manicuring board of FIG. 5 along the line I—I showing the end opening of the side slot.

With reference to FIG. 5, because many individuals having use of only one arm can find it difficult to perform fingernail maintenance, this embodiment of the chopping board system includes a wooden manicure board 40 having a side slot 42 adapted for receiving and holding an emery board 44, and a nail clipper retaining screw 46 used to attach a nail clipper 48. In this embodiment wooden manicure board 40 is sized such that a portion thereof is positionable within cavity 36 (FIG. 3) of tray member 30. With reference to FIG. 6, side slot 42 is partially defined by side ledges 50 that maintain emery board 44 is position during use.

It can be seen from the preceding description that a chopping board system has been provided that includes a chopping board member having a mechanism for securing the item to be chopped to the chopping board; that includes a mechanism for securing the item to be chopped in a number of independent locations; that includes a chopping board member having a non-skid surface; that includes a chopping board member having a non-skid surface at least partially formed with a restickable adhesive material; that includes a chopping board member having a non-skid surface at least partially formed with a restickable adhesive material that further includes a tray member having an edge portion that defines a cavity sized to receive the non-skid surface therein; and that includes a chopping board member having a first surface defined by a first perimeter edge and formed from a non-skid material and a second surface defined by a second perimeter edge and formed from a chopping board material, the chopping board member having a plurality of securing pin passageways formed entirely through the chopping board member between the first and second surfaces; and a plurality of anchoring pins sized to frictionally fit into the securing pin passageways, each anchoring pin having at least one pointed pin end for insertion through an item to be chopped.

It is noted that the embodiment of the chopping board system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A chopping board system comprising:

a chopping board member having a first surface defined by a first perimeter edge and formed from a non-skid material and a second surface defined by a second perimeter edge and formed from a chopping board material, said chopping board member having a plurality of securing pin passageways formed entirely through said chopping board member between said first and said second surfaces; and a plurality of anchoring pins sized to frictionally fit into said securing pin passageways, each of said plurality of anchoring pins having at least one pointed pin end for insertion through an item to be chopped;

said chopping board member has a compartment formed therein for storing said anchoring pins.

2. The chopping board system of claim 1, wherein:

said non-skid surface is at least partially formed with a restickable adhesive material.

3. The chopping board system of claim 2 further including:

a tray member having an edge portion that defines a cavity sized to receive said non-skid surface therein.

4. The chopping board system of claim 1 further including:

a nail cutting and manicuring board having a side slot formed therein sized and configured for receiving and holding an emery board, and a nail clipper retaining screw and screw aperture for securing a nail clipper thereto.

5. The chopping board system of claim 2 further including:

a nail cutting and manicuring board having a side slot formed therein sized and configured for receiving and holding an emery board, and a nail clipper retaining screw and screw aperture for securing a nail clipper thereto.

6. The chopping board system of claim 3 further including:

a nail cutting and manicuring board having a side slot formed therein sized and configured for receiving and holding an emery board, and a nail clipper retaining screw and screw aperture for securing a nail clipper thereto.

* * * * *